Dec. 12, 1972          G. A. KOLKO ET AL          3,705,788
                      URINALYSIS WORK RACK
                      Filed Dec. 21, 1970

Gary A. Kolko
Clifford Brown
INVENTORS
BY
ATTORNEYS

United States Patent Office 3,705,788
Patented Dec. 12, 1972

3,705,788
URINALYSIS WORK RACK
Gary A. Kolko, Overland Park, Kans., and Clifford Brown, Kansas City, Mo., assignors to Menorah Medical Center, Kansas City, Mo.
Filed Dec. 21, 1970, Ser. No. 99,923
Int. Cl. G01n 1/16, 1/18
U.S. Cl. 23—259                                    5 Claims

ABSTRACT OF THE DISCLOSURE

A laboratory rack to aid in urinalysis sample handling and identification. Radially extending dividers are mounted on a rotatable turntable to provide sample compartments for receiving specimen beakers. Above the dividers, and of lesser diameter than the turntable, is a circular multitier deck having a plurality of holes therein arranged to hold two test tubes in alignment with and above each sample compartment. The central portion of the deck is equipped with cylindrical sleeves for retaining urinalysis test supplies and equipment.

BACKGROUND AND SUMMARY OF THE INVENTION

In addition to blood, the analysis of urine represents one of the earliest laboratory attempts to gain vital health information supplied by the body's own fluids. Today, urinalysis is an important diagnostic tool, as well as a means for monitoring a patient's reaction to a specific treatment. So widely used in this analysis, that measurement of pH, specific gravity, albumen, and glucose, and observance of color, clarity, and microscopic viewing are considered routine with modern testing procedures.

Unfortunately, the more-or-less mechanical aspects of urinalysis work, such as sample handling and identification, have not kept abreast of the sophisticated testing procedures themselves.

In high volume work, to which this invention particularly relates, a urinalysis lab may typically be required to analyze between 15 and 30 specimens per run and make two or three runs each day. For each run, the bulk specimens, contain in single use beakers, are lined up on a long counter with a service requisition paper in front of each specimen. The requisitions contain patient identifying information, together with an area for recording the test results. At one end of the row of specimen beakers is a wire rack for holding test tubes. For each specimen, two test tubes in the rack are properly marked by a grease pencil for reference to the patient and then filled from the bulk specimen.

One test tube is placed in a centrifuge in preparation for a microscopic examination, and the other test tube is used in a glucose analysis. The remaining test are conducted on the bulk specimen in its beaker and generally involve dipping chemically treated test sticks or papers into the specimen after which a color change of the stick may be observed.

It is not difficult to image the distance that the lab technician travels by walking along the front of the counter to the various specimens to perform the work and record the results. To analyze 30 specimens in a single run, about 12 lineal feet of counter top is needed and the technician travels about 80 years before completing the work. This type of lost motion adds only time and expense to urinalysis tests.

Certainly time and expense cannot be completely overlooked in evaluating current urinalysis techniques. However, the fact remains that the biggest single problem associated with urinalysis is the problem of sample identification. Irrespective of the number of times the bulk specimen is split up into various test tubes, all of the tests for thas specimen must be identified for reference back to the particular patient to insure meaningful results. Otherwise, the attending physician will base a diagnosis or decision on false information, and life itself in some cases may balance on such decisions.

The primary object of this invention is to provide a urinalysis work rack which aids in sample identification to insure that all urinalysis tests conducted will relate to a specific specimen. Not only is a numerical marking technique utilized, but a positional referencing is also employed for a double check on sample identification.

Another object of the invention is to provide a urinalysis work rack to help minimize the time and expense of conducting high volume work. Such is achieved by having the lab technician in a specified position, preferably seated, and then having the specimens movable with respect to the technician; a reversal of the presently employed technique. In this manner, the testing procedures can be carried out with very little loss motion and the likelihood of spilled samples is diminished.

Other and further objects of the invention, together with the features of novelty appurtenant thereto, will appear in the course of the following description.

DESCRIPTION OF THE DRAWING

In the accompanying drawing, which forms a part of the specification and is to be read in conjunction therewith, and in which like reference numerals are employed to indicate like parts in the various views.

Figure 1:
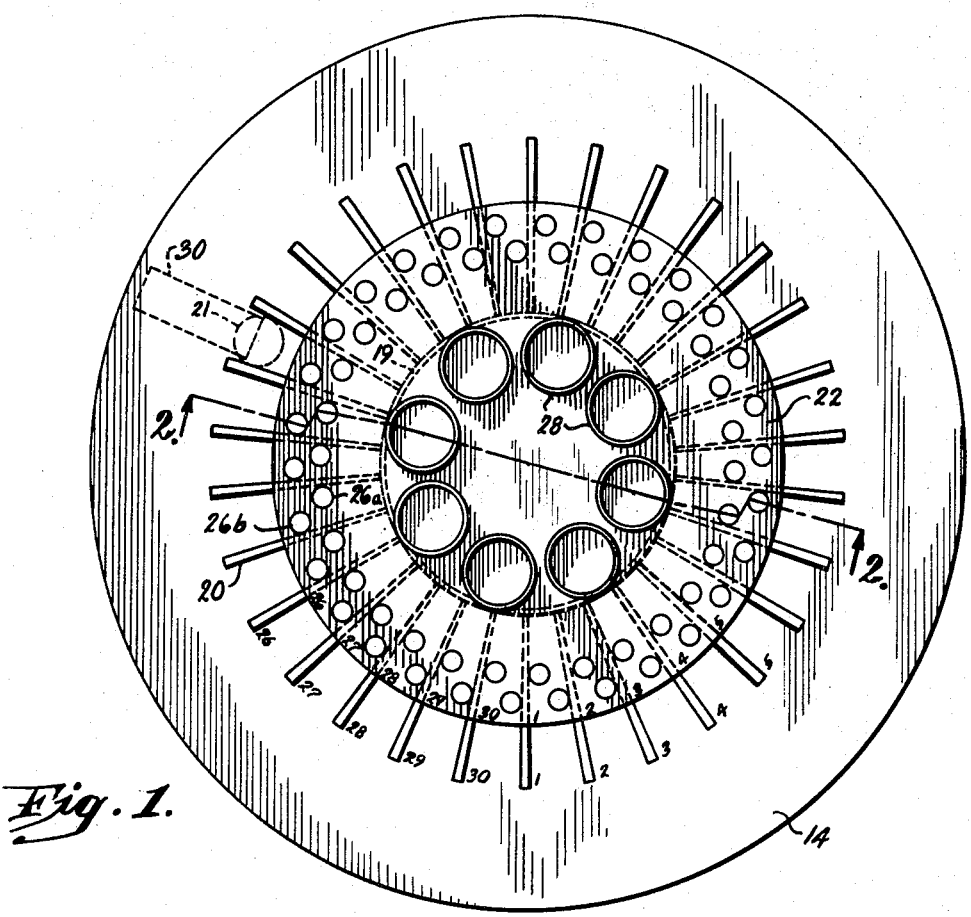
FIG. 1 is a plan view of a urinalysis rack constructed in accordance with a preferred embodiment of the invention.

Referring to the drawing in more detail, the urinalysis rack includes a circular base 10 supported by a plurality of legs 11. Atop the base 10 is a circular raceway 12 having a plurality of ball bearings 13 therein.

Disposed above the base 10 and supported thereon is a rotatable, circular turntable 14. The turntable 14 is concentrically aligned with the base 10 by a pivot pin 15 which extends through the turntable 14 and the base 11 where it is secured by a nut 16. On the underside of the turntable 14 is attached a circular track 17 which rests on the ball bearings 13 of the raceway 12 to permit the turntable 14 to be freely rotated with respect to the base 10. Manipulation of the nut 16 on the pivot pin 15 provides a damper effect to increase or reduce the effort required to move the turntable 14.

The turntable 14 is also equipped with a circumferential apron 18 which extends downwardly past the base 10 in order to protectively shield the raceway 12 and prevent access of foreign materials thereto.

Attached to and concentrically aligned with the turntable 14, but of smaller diameter, is a cylindrical pedestal 19. Supported by the pedestal 19 and the turntable 14 are a plurality of spaced divider panels 20 arranged around the pedestal 19 in a radial sunburst pattern. If desired, the divider panels 20 may be extended to the edge of the turntable 14. The space between two successive panels 20 defines a sample compartment at the outer end of which laboratory beaker 21 of conventional size may be disposed as illustrated in FIG. 1. Depressions in the turntable 14 may be made to accommodate the beakers 21 and prevent their accidental movement.

Above the upper end of the pedestal 19, and concentrically aligned therewith, are a plurality of circular tiers 22, 23 and 24, spaced apart from each other by spacing bars 25. Around the outer peripheral portion of the upper and intermediate tiers 22 and 23, respectively, are bored a plurality of holes 26a and 26b of sufficient diameter to receive conventional laboratory test tubes 27. The holes 26a and 26b in the upper tier 22 register with the holes 26a and 26b in the intermediate tier whereby the bottom of a test tube 27 rests on the lower tier 24 that is attached to the pedestal 19.

As shown in FIG. 1, a pair of holes 26a and 26b are aligned above each sample compartment. The innermost holes 26a of each pair are diagonally offset from the outermost holes 26b. Thus, there is unimpaired access and visual contact with the test tube received in the innermost holes 26a. Such may also be accomplished by having each pair of holes 26a and 26b disposed side-by-side at the outer edge of the tiers 22 and 23. However, we prefer the offset arrangement of the holes because a more convenient size of rack can be constructed.

So constructed, each pair of test tube holes 26a and 26b and the associated space between adjacent divider panels 20 defines a sample station. By virtue of this fixed relative position, therefore, indexing reference is provided between the test tubes and the lower working area.

In addition, as indicated in FIG. 1, number references are also provided. For each sample station, a number is placed on the upper tier 22 and a like number is placed on the turntable 14 in alignment with the first-mentioned number. Although thirty sample stations are shown in FIG. 1, any convenient number could be constructed depending on the overall size of the unit needed.

Figure 2:
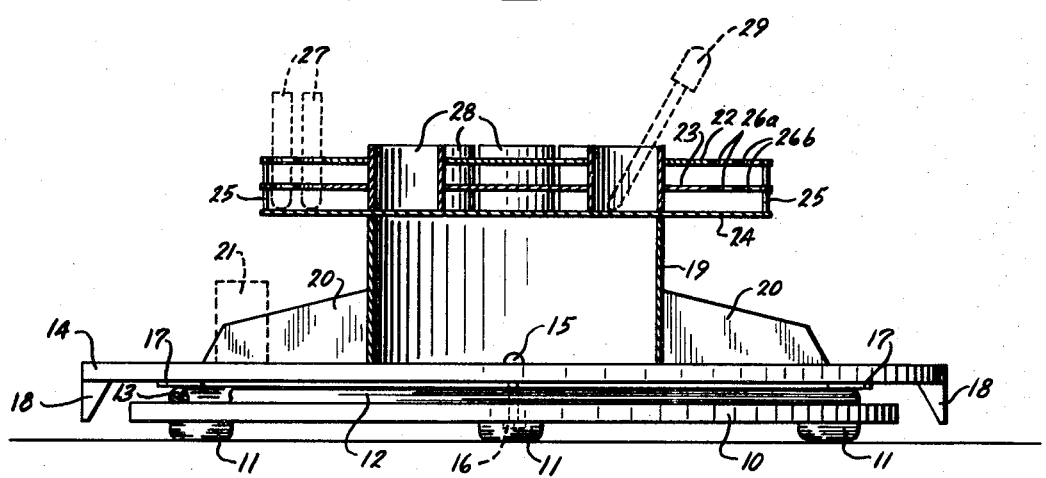
FIG. 2 is a side sectional view of the rack taken along line 2—2 of FIG. 1 in the direction of the arrows.

Toward the inner or central portion of said tiers 22, 23 and 24 are a plurality of cylindrical sleeves 28 which are disposed in holes through the upper and intermediate tiers 22 and 23 to rest on the lower tier 24. The sleeves 28 hold the various equipment and supplies used for urinalysis testing, such as the eye dropper 29 shown in FIG. 2.

At this point, a description of a typical urinalysis testing procedure, employed in conjunction with the work rack, is beneficial for a better understanding of the various advantages achieved with our invention.

Since this urinalysis work rack is specifically designed for high volume work, it is assumed that a large number of urine specimens are to be analyzed. Each bulk specimen is delivered to the lab in a beaker and is accompanied by a service requisition slip that normally contains patient identification information, as well as a portion on which the testing results can be recorded. The laboratory technician places each beaker on its requisition slip (such as indicated in FIG. 1 by the numeral 30) on the turntable 14 in a sample compartment between adjacent divided panels 20. Normally a visual clarity test is performed at this time and recorded.

From each beaker, the technician then pours a portion of the bulk specimen into two clean test tubes held in the multitier deck. As both test tubes are easily visible to the technician, they need not be picked up for purposes of filling. When necessary, the operator need only rotate the turntable 14 in order to bring successive sample stations to the front.

One test tube from each sample station, which is marked with the sample station number, is then removed from the work rack and placed in a centrifuge. This portion of the specimen is later subjected to microscopic examination.

The second test tube at each sample station is diluted with distilled water and a reagent in the form of a small pill is placed in each tube. A colored gradation of the specimen, produced by the reagent, is observed and indicates an approximate quantitative test for glucose. The results are recorded as observed. The rotatable feature of the work rack permits the operator to remain seated if he so desires.

Next, test sticks which may typically have several bands of chemical coating thereon are dipped into the bulk specimen and then laid across the lip of the beaker to dry. Color changes in the various test sticks indicate the results for specific tests, such as pH, and are then recorded.

To complete the routine urinalysis, a portion of the bulk specimen is withdrawn by an eye dropper and placed in a hydrometer for determining specific gravity. Likewise, this result is recorded on the requisition slip.

By locating the centrifuge and the hydrometer in close proximity to the urinalysis work rack in the laboratory, it should be obvious that the laboratory technician may perform the above-described urinalysis testing procedure without leaving his seated position. The various sample stations can be oriented to the front merely by rotating the turntable 14. The various reagents, test sticks, and other equipment are conveniently located in the cylindrical sleeves 28 provided for this purpose.

This work rack may also be applied to micro and macro bacteriology work which requires the growing, transferring, and testing of various agar cultures. However, from the foregoing, it will be seen that this invention is one well adapted to attain all of the ends and objects hereinabove set forth, together with other advantages which are obvious and which are inherent to the invention.

It will be understood that certain features and subcombinations are of utility and may be employed without reference to other features and subcombinations. This is contemplated by and is within the scope of the claims.

As many possible embodiments may be made of the invention without departing from the scope thereof, it will be understood that all matter herein set forth or shown in the accompanying drawing is to be interpreted as illustrative and not in a limiting sense.

Having thus described our invention, we claim:

1. A laboratory work rack comprising:
   a circular rotatable horizontal platform;
   a cylindrical core fixed to the center of said platform with its axis vertical,
   a plurality of angularly spaced and radially extended partitions attached at their lower ends to said platform and at their inner ends to said core, adjacent partitions defining with said platform and core a substantially radially extending sample compartment for receiving a laboratory specimen container; and
   a test tube holding structure surmounting said partitions peripheral of said core,
   said structure of lesser diameter than said platform and including test tube retaining means around the peripheral portion thereof adapted to hold at least one laboratory test tube in fixed relative position with respect to each said sample compartment,
   and storage means centrally disposed on top of said core centrally positioned of said holding structure for retaining testing supplies and equipment therein,
   the radial extension of the partitions of the platform substantially less than the platform radius whereby a continuous horizontal work space is provided peripherally of said core and compartments.

2. The work rack as in claim 1, said holding structure comprising a plurality of spacedly stacked disks and said test tube retaining means comprising a plurality of holes bored through the peripheral portion of all of said disks above the bottommost disk.

3. The work rack as in claim 1, said test tube retaining means adapted to hold at least two laboratory test tubes in fixed relative position with respect to each said sample compartment and offset in radial alignment to permit unimpaired visual inspection of said test tubes.

4. The work rack as in claim 1 including:
   a first identifying mark placed on said turntable for each of said sample compartments, said first mark for each compartment being different from the first marks for the other compartments; and
   a second identifying mark identical to said first mark for each of said sample compartments and placed on said holding structure in alignment with said first mark.

5. The work rack as in claim 1, said storage means including a plurality of upright tubular sleeves mounted on said holding structure.

References Cited
UNITED STATES PATENTS

| | | | |
|---|---|---|---|
| 3,081,158 | 3/1963 | Winter | 23—259 |
| 3,192,968 | 7/1965 | Baruch et al. | 23—259 X |
| 3,489,525 | 1/1970 | Natelson | 23—259 X |
| 3,540,858 | 11/1970 | Rochte et al. | 23—292 |
| 3,595,129 | 7/1971 | Jones | 23—259 X |

MORRIS O. WOLK, Primary Examiner

R. E. SERWIN, Assistant Examiner

U.S. Cl. X.R.

23—292; 73—425.4; 141—130